United States Patent
Chuang et al.

(10) Patent No.: US 11,964,201 B2
(45) Date of Patent: Apr. 23, 2024

(54) MODULAR PNEUMATIC SOMATOSENSORY DEVICE

(71) Applicant: National Yang Ming Chiao Tung University, Hsinchu (TW)

(72) Inventors: Jen-Hui Chuang, Hsinchu (TW); June-Hao Hou, Hsinchu (TW); Chi-Li Cheng, Kaohsiung (TW); Han-Ting Lin, Taipei (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 17/592,043

(22) Filed: Feb. 3, 2022

(65) Prior Publication Data
US 2023/0144356 A1    May 11, 2023

(30) Foreign Application Priority Data

Nov. 11, 2021   (TW) .................................. 110142041

(51) Int. Cl.
*A63F 13/285*    (2014.01)
*A63F 13/212*    (2014.01)

(52) U.S. Cl.
CPC .......... *A63F 13/285* (2014.09); *A63F 13/212* (2014.09); *A63F 2300/8082* (2013.01)

(58) Field of Classification Search
CPC .................... G06F 3/017; A63F 13/212; A63F 2300/8082; A63F 13/285; A61H 9/0078
See application file for complete search history.

(56) References Cited

U.S. PATENT DOCUMENTS

| | | | | |
|---|---|---|---|---|
| 5,427,577 | A * | 6/1995 | Picchietti | A61F 5/0118 |
| | | | | 473/59 |
| 6,368,357 | B1 * | 4/2002 | Schon | A61H 9/0078 |
| | | | | 623/37 |

(Continued)

FOREIGN PATENT DOCUMENTS

| CN | 108209866 A | 6/2018 |
|---|---|---|
| CN | 109316742 A | 2/2019 |

(Continued)

OTHER PUBLICATIONS

Ou, Jifei et al., "aeroMorph—Heat-sealing Inflatable Shape-change Materials for Interaction Design," UIST '16: Proceedings of the 29th Annual Symposium on User Interface Software and Technology, Oct. 2016, pp. 121-132.

(Continued)

*Primary Examiner* — Justin L Myhr
*Assistant Examiner* — Carl V Larsen
(74) *Attorney, Agent, or Firm* — Muncy, Geissler, Olds & Lowe, P.C.

(57) ABSTRACT

A modular pneumatic somatosensory device comprises a main body, a plurality of airbags, a plurality of inflating modules and a control module. The airbags are detachably disposed at different positions of the main body, and at least a part of the airbags have different sizes. The inflating modules are detachably disposed on the main body, and each inflating module is correspondingly connected with at least one of the airbags. The control module is detachably disposed on the main body and is electrically connected with the inflating modules. The control module controls the inflating modules to inflate the corresponding airbags according to a control signal.

10 Claims, 8 Drawing Sheets

(56) References Cited

U.S. PATENT DOCUMENTS

| | | | | |
|---|---|---|---|---|
| 6,387,064 B1* | 5/2002 | Gunnon | A61H 9/0085 | 601/149 |
| 6,422,941 B1* | 7/2002 | Thorner | A63F 13/285 | 463/36 |
| 6,726,638 B2* | 4/2004 | Ombrellaro | G16H 40/67 | 600/587 |
| 7,967,679 B2* | 6/2011 | Ombrellaro | F41H 1/02 | 463/47 |
| 9,700,786 B2* | 7/2017 | Ma | A63F 9/24 | |
| 9,949,890 B2* | 4/2018 | Choudhury | G06F 3/04847 | |
| 9,981,182 B2* | 5/2018 | Goslin | G06F 1/163 | |
| 10,540,870 B1* | 1/2020 | West | A63F 13/98 | |
| 10,546,471 B1* | 1/2020 | West | A41D 19/0024 | |
| 10,636,260 B1* | 4/2020 | Young | A63F 13/285 | |
| 11,148,048 B2* | 10/2021 | Yokoyama | H04R 9/00 | |
| 11,727,779 B1* | 8/2023 | Butler | G08B 21/0286 | 340/539.15 |
| 2002/0036420 A1* | 3/2002 | Footitt | A47C 1/03205 | 297/284.4 |
| 2003/0139695 A1* | 7/2003 | Riach | A61F 5/012 | 602/13 |
| 2005/0250582 A1* | 11/2005 | Lopez | A63F 13/285 | 463/47 |
| 2008/0153590 A1* | 6/2008 | Ombrellaro | F41J 5/24 | 463/30 |
| 2008/0255485 A1* | 10/2008 | Johnson | A61H 9/0078 | 601/149 |
| 2009/0069081 A1* | 3/2009 | Thorner | G06F 3/016 | 463/30 |
| 2012/0022415 A1* | 1/2012 | Mullen | A61H 9/0078 | 601/150 |
| 2012/0065561 A1* | 3/2012 | Ballas | A61H 9/0092 | 601/152 |
| 2014/0052035 A1* | 2/2014 | Britt | A61F 7/00 | 602/2 |
| 2015/0105129 A1* | 4/2015 | Chapman | A63F 13/212 | 463/7 |
| 2016/0000640 A1* | 1/2016 | Lai | G16H 20/30 | 601/149 |
| 2016/0139666 A1* | 5/2016 | Rubin | A63F 13/212 | 345/633 |
| 2016/0296838 A1* | 10/2016 | Goetgeluk | A63F 13/00 | |
| 2018/0190087 A1* | 7/2018 | Maalouf | G06F 1/163 | |
| 2018/0200619 A1* | 7/2018 | Guillotel | A63F 13/285 | |
| 2019/0120997 A1* | 4/2019 | Benke | G01T 1/2907 | |
| 2019/0133215 A1* | 5/2019 | Whalen | A61B 17/135 | |
| 2019/0209044 A1* | 7/2019 | Hess | A61B 5/6898 | |
| 2019/0247217 A1* | 8/2019 | Govin | A61F 5/024 | |
| 2020/0103966 A1* | 4/2020 | Khoshkava | G06F 3/038 | |
| 2020/0221667 A1* | 7/2020 | Duff | A01K 13/006 | |
| 2020/0237031 A1* | 7/2020 | Daniels | H04W 4/029 | |
| 2020/0296167 A1* | 9/2020 | Bdeir | H04L 67/125 | |
| 2020/0337402 A1* | 10/2020 | Lin | A41D 1/002 | |
| 2020/0394938 A1* | 12/2020 | Cerniglia | G09F 3/0295 | |
| 2021/0069056 A1* | 3/2021 | Berthet | A61H 9/0078 | |
| 2021/0267085 A1* | 8/2021 | Wigelsworth | H05K 7/1488 | |
| 2022/0011869 A1* | 1/2022 | Lawrence | G06F 3/011 | |
| 2022/0387248 A1* | 12/2022 | Pickett | A61H 9/0092 | |
| 2023/0116236 A1* | 4/2023 | Sun | F04B 49/22 | 137/1 |
| 2023/0293795 A1* | 9/2023 | Venkatachalapathy | A61M 5/1486 | 604/29 |

FOREIGN PATENT DOCUMENTS

| | | |
|---|---|---|
| CN | 109758156 A | 5/2019 |
| CN | 112034980 A | 12/2020 |
| TW | 202010443 A | 3/2020 |

OTHER PUBLICATIONS

Ryuma Niiyama et al., "Printable Pneumatic Artificial Muscles for Anatomy-based Humanoid Robots," IEEE-RAS 15th International Conference on Humanoid Robots (Humanoids), Seoul, Korea, Nov. 3-5, 2015, pp. 401-406.

Bin Yu et al., "Breathe with Touch: A Tactile Interface for Breathing Assistance System," INTERACT 2015, The 15th International Conference on Human-Computer Interaction, Bamburg, Germany, Sep. 2015, pp. 45-52.

* cited by examiner

MODULAR PNEUMATIC SOMATOSENSORY DEVICE

CROSS REFERENCE TO RELATED APPLICATIONS

This Non-provisional application claims priority under 35 U.S.C. § 119(a) on Patent Application No(s). 110142041 filed in Taiwan, Republic of China on Nov. 11, 2021, the entire contents of which are hereby incorporated by reference.

BACKGROUND

Technology Field

The present disclosure relates to a somatosensory device and, in particular, to a modular pneumatic somatosensory device.

Description of Related Art

Currently, in order to experience a video game more realistically in a game scene, the input device of the video game has gradually developed into a somatosensory device for playing a somatosensory game (or a motion sensing game). Namely, the somatosensory game is a video game that is experienced with the body, which is totally different from the conventional operation method that simply uses a joystick (with buttons and stick). The somatosensory game is a new type of video game that is operated through changes of body movements or gestures.

SUMMARY

One or more exemplary embodiments of this disclosure are to provide a modular pneumatic somatosensory device having a high operation flexibility and freedom.

In an exemplary embodiment, a modular pneumatic somatosensory device of this disclosure comprises a main body, a plurality of airbags, a plurality of inflating modules and a control module. The airbags are detachably disposed at different positions of the main body, and at least a part of the airbags have different sizes. The inflating modules are detachably disposed on the main body, and each of the inflating modules is correspondingly connected with at least one of the airbags. The control module is detachably disposed on the main body and electrically connected with the inflating modules. The control module controls the inflating modules to inflate the corresponding airbags according to a control signal.

In one embodiment, the airbags, the inflating modules and the control module are detachably disposed on the main body by hook and loop fasteners and/or buckle fasteners.

In one embodiment, the airbags having different sizes are disposed at different positions of the main body based on a requirement of a user.

In one embodiment, each airbag comprises a plurality of air cells, and the inflating module inflates the corresponding airbag so as to inflate the air cells of the airbag.

In one embodiment, the control signal is a wireless transmitted signal.

In one embodiment, the control signal is a wire transmitted signal.

In one embodiment, the control module comprises a communication unit, and the communication receives the control signal.

In one embodiment, the control signal is received from a VR device or an AR device.

In one embodiment, the VR device or the AR device comprises a communication unit corresponding to the communication unit of the control device.

In one embodiment, the modular pneumatic somatosensory device further comprises a power module detachably disposed on/in the main body, and the power module is electrically connected to the control module and the inflating modules.

As mentioned above, in the modular pneumatic somatosensory device of this disclosure, the airbags are detachably disposed at different positions of the main body, and at least a part of the airbags have different sizes. The inflating modules are detachably disposed on the main body, and each of the inflating modules is correspondingly connected with at least one of the airbags. The control module is detachably disposed on the main body and electrically connected with the inflating modules. The control module controls the inflating modules to inflate the corresponding airbags according to a control signal. Accordingly, the modular pneumatic somatosensory device of this disclosure has the following advantages of: 1. adapting the modular design instead of the integral design, so that the user can assemble, disassemble, repair or replace parts by himself/herself; 2. in the application of, for example, motion sensing games, the airbags of different sizes can be optionally installed corresponding to different parts of the user's body based on the somatosensory operation requirements so as to feedback the real-time somatosensory of different body parts, so that the user can experience the feelings of vibration and being held and squeezed at different body parts, thereby achieving a high operation flexibility and freedom; and 3. for children who are not suitable for using car seat belts, the modular pneumatic somatosensory device can reduce the impact force of collision accidents and reduce the probability and severity of injuries.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
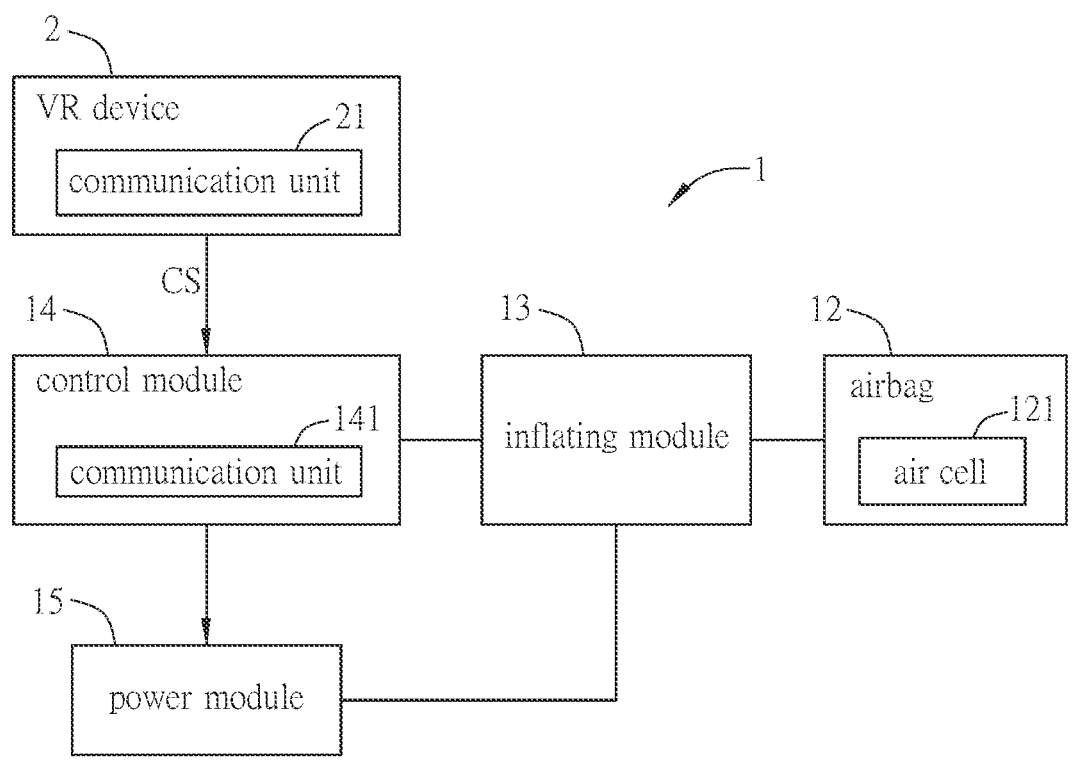
FIG. 1 is a schematic block diagram of a modular pneumatic somatosensory device according to an embodiment of this disclosure.
Figure 2:
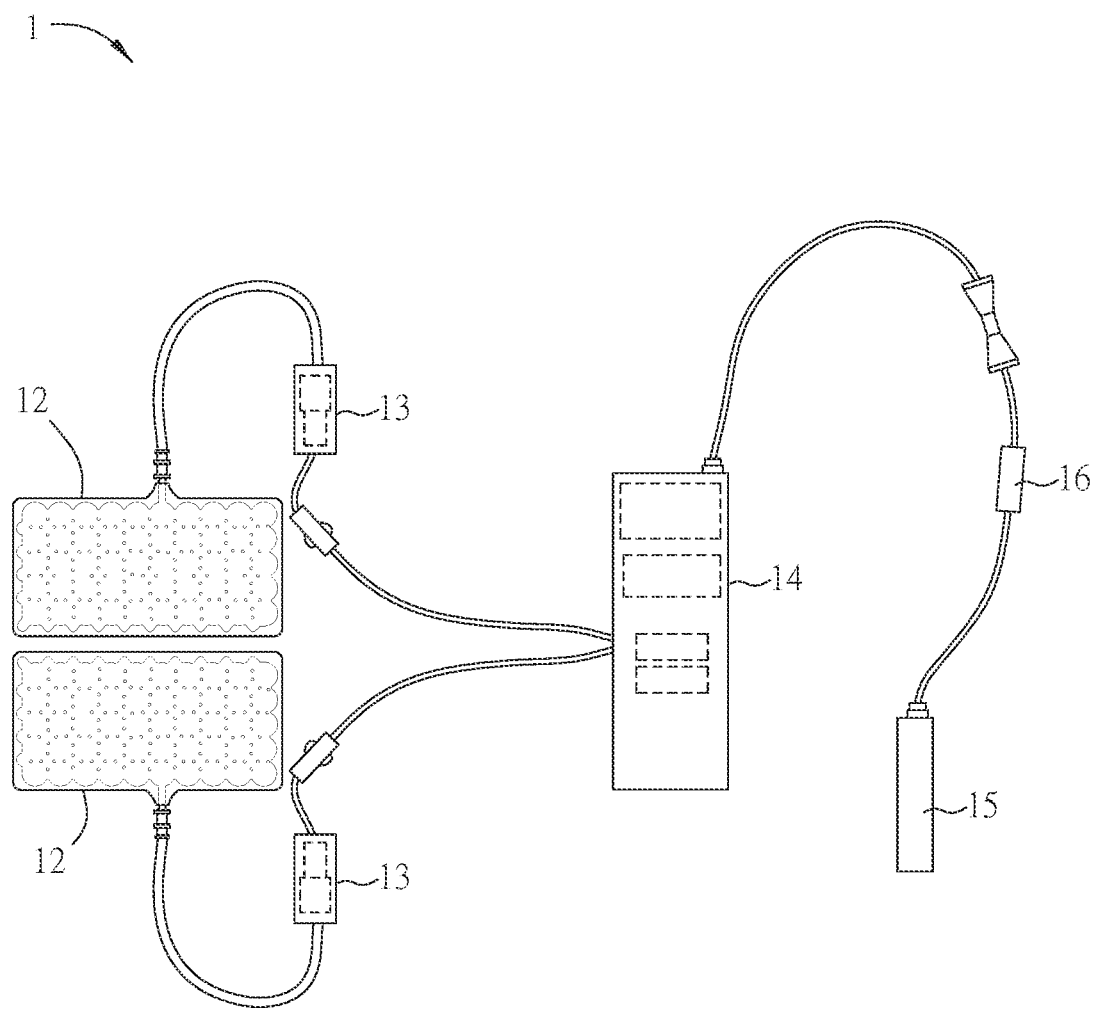
FIG. 2 is a schematic diagram showing a modular pneumatic somatosensory device according to an embodiment of this disclosure.
Figure 3A:
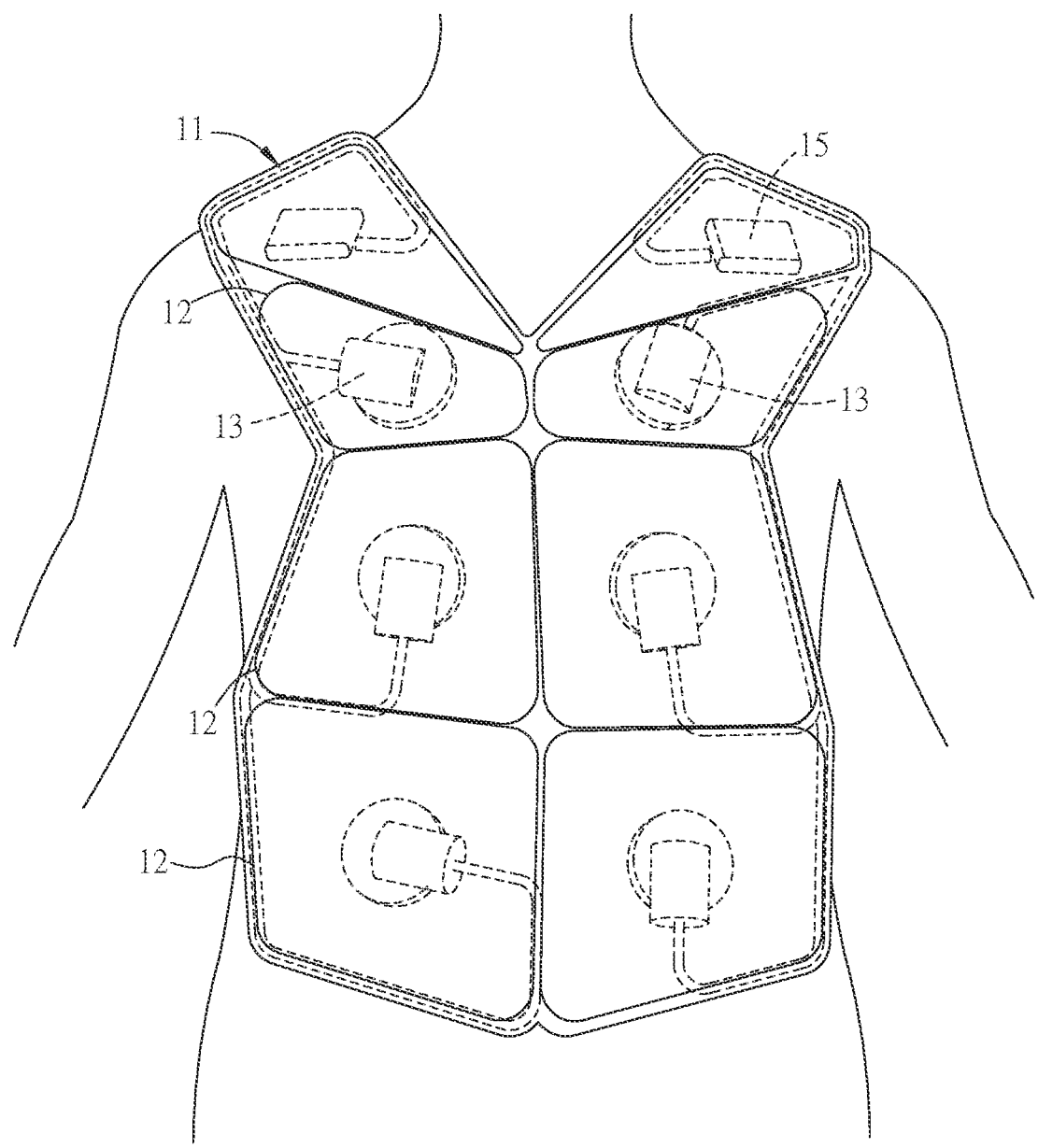
FIG. 3A is a front view of the modular pneumatic somatosensory device in use according to the embodiment of this disclosure.
Figure 3B:
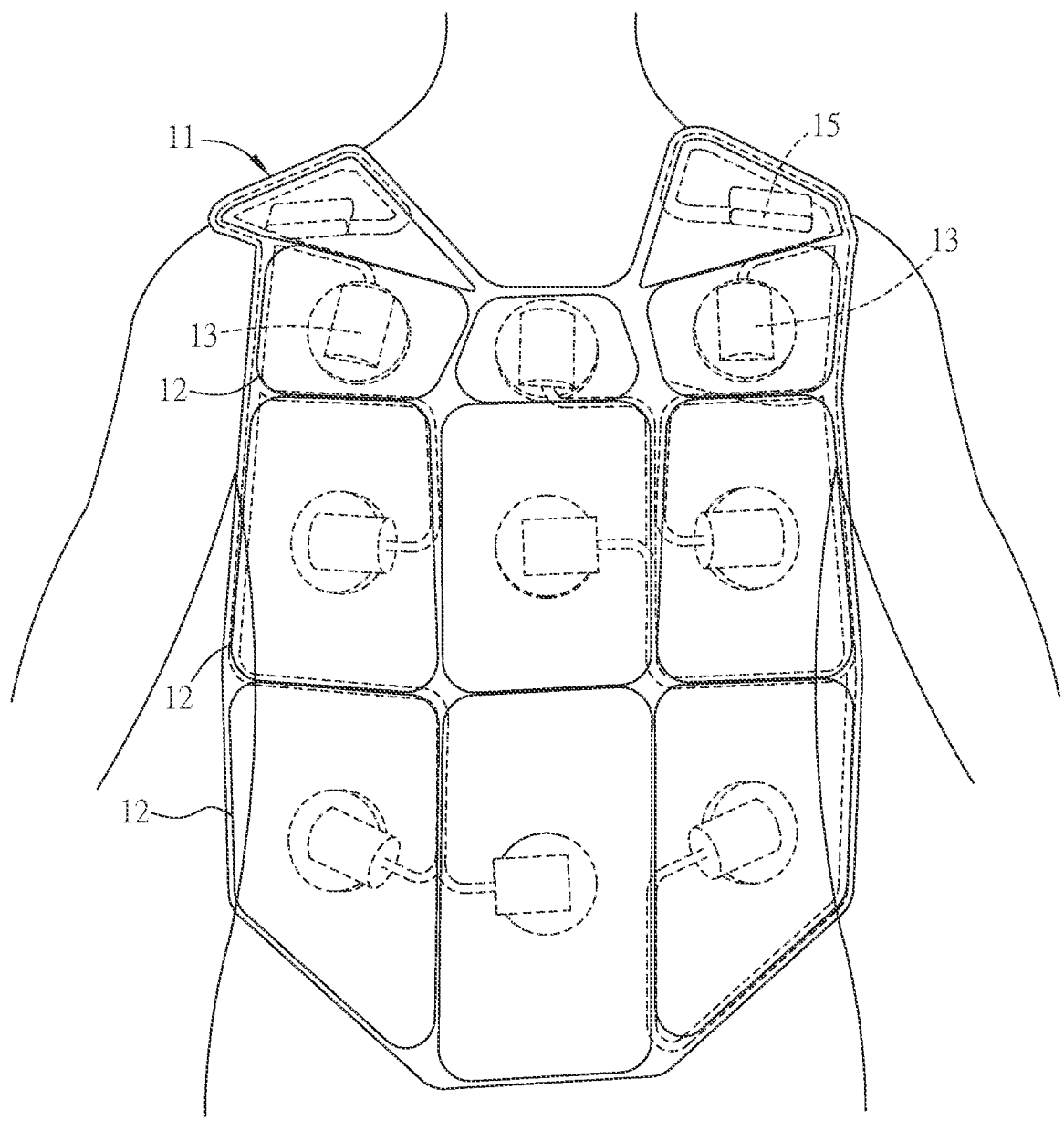
FIG. 3B is a rear view of the modular pneumatic somatosensory device in use according to the embodiment of this disclosure.
Figure 3C:
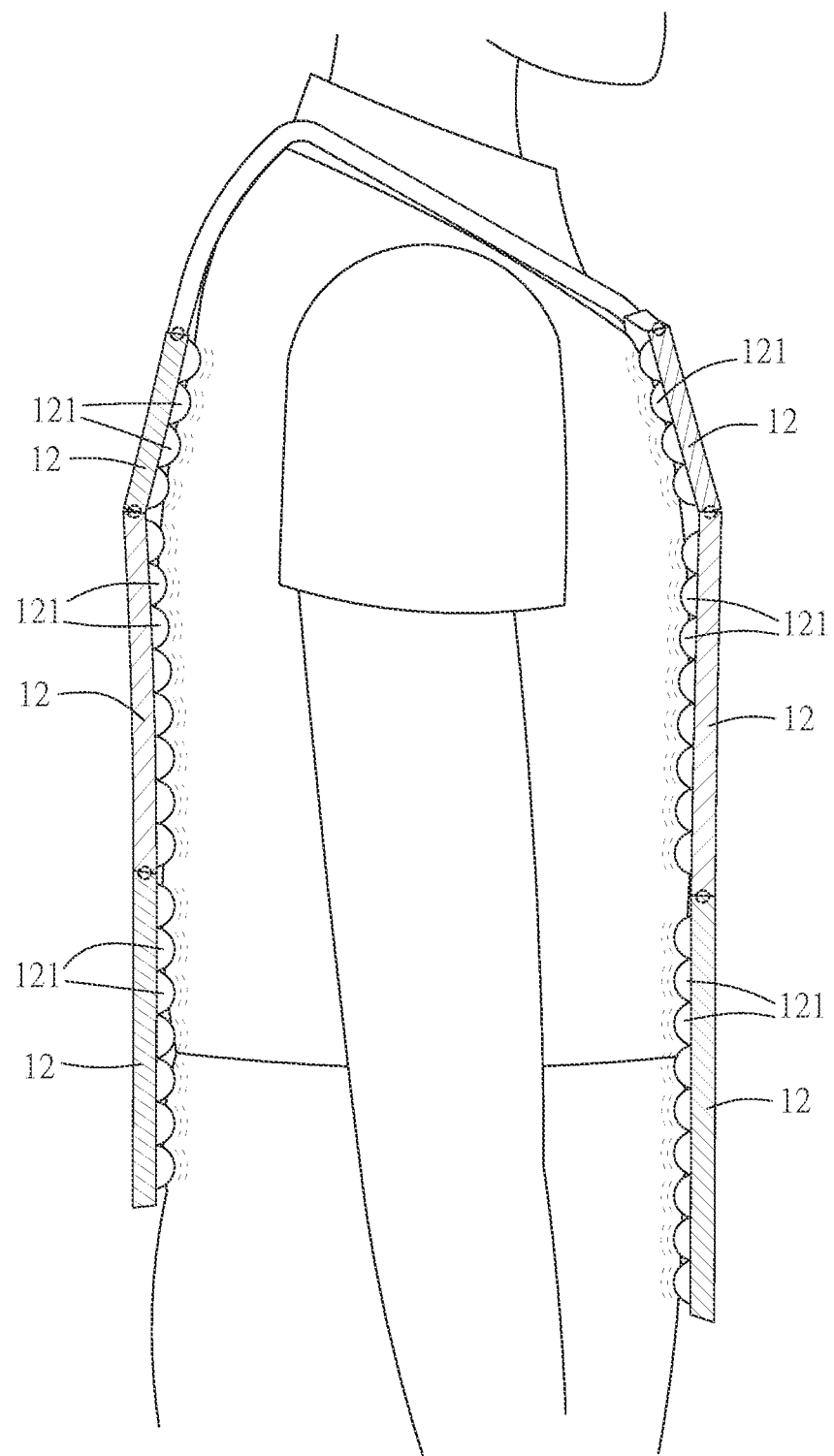
FIG. 3C is a side view of the modular pneumatic somatosensory device of FIGS. 3A and 3B, which is wore on a user.

FIG. 1 is a schematic block diagram of a modular pneumatic somatosensory device according to an embodiment of this disclosure, FIG. 2 is a schematic diagram showing a modular pneumatic somatosensory device according to an embodiment of this disclosure, FIGS. 3A and 3B are a front view and a rear view of the modular pneumatic somatosensory device in use according to the embodiment of this disclosure, and FIG. 3C is a side view of the modular pneumatic somatosensory device of FIGS. 3A and 3B, which is wore on a user. To be noted, FIG. 2 only shows two airbags 12 and two inflating modules 13. In practice, the numbers of the airbags 12 and the inflating modules 13 can be more than two. For example, as shown in FIGS. 3A and 3B, the number of each of the airbags 12 and the inflating modules 13 is 15, and these airbags 12 and inflating modules 13 are arranged at different positions on the front side and the rear side of the main body 11. In addition, FIG. 3C shows only the positions of the airbags 12 with respect to the user's body but does not show the main body 11 (vest).

Referring to FIGS. 1 and 2, the modular pneumatic somatosensory device 1 comprises a main body 11 (see FIG. 3A), a plurality of airbags 12, a plurality of inflating modules 13, and a control module 14. In addition, the modular pneumatic somatosensory device 1 of this embodiment further comprises a power module 15 and a switch 16 (see FIG. 2).

The main body 11 can be designed to be wore on any part of a user. For example, the main body 11 can be a vest (see FIG. 3A), pants, leggings, a helmet, or any other styles of parts to be wore on the user's body. This disclosure is not limited thereto. For easy understanding, the embodiment as shown in FIGS. 3A to 3C is a vest as an example.

A plurality of airbags 12 are detachably disposed at different positions of the main body 11. In this embodiment, at least a part of the airbags 12 have different sizes, and the airbags 12 with different sizes are arranged at different positions of the main body 11 based on the requirement of user.

A plurality of inflating modules 13 are detachably disposed on the main body 11, and each inflating module 13 correspondingly connects to at least one of the airbags 12. For example, the inflating module 13 can comprise an inflator pump and other components for installing the inflator pump. When the inflator pump inflates the airbag 12, the airbag 12 can swell to provide a pushing force. In some embodiments, in order to facilitate the user to connect and assemble, different inflating modules 13 can be connected to different sizes of airbags 12. In practice, different inflating modules 13 and different airbags 12 can be connected and distinguished by connecting tubes of different colors. For example, the inflation module 13 with a red connecting tube is connected to the airbag 12 with a red connecting tube, and the inflation module 13 with a green connecting tube is connected to the airbag 12 with a green connecting tube. This design is convenient for users to assemble or/and disassemble the components, and it is also convenient for users to install and replace by themselves.

In the embodiment as shown in FIGS. 3A to 3B, the modular pneumatic somatosensory device 1 comprises fifteen airbags 12 and fifteen inflating modules 13, which are detachably disposed at different positions of the main body 11 (vest). As shown in FIG. 3A, the front side of the main body 11 (vest) is configured with six airbags 12 corresponding to the upper part of left chest, the upper part of right chest, the lower part of left chest, the lower part of right chest, the left abdomen, and the right abdomen, respectively, and at least a part of the six airbags 12 have different sizes. For example, the airbags 12 at the upper parts of the left and right chest substantially have the same size, but are different from (smaller than) the airbags 12 at the lower part of left chest, the lower part of right chest, the left abdomen, and the right abdomen. In different embodiments, the airbags 12 at the upper parts of the left and right chest have different sizes. In addition, the airbags 12 at the lower parts of the left and right chest are smaller than the airbags 12 at the left abdomen and the right abdomen. To be noted, the sizes of the plurality of airbags 12 at the front side can be varied and are not limited to the above example.

As shown in FIG. 3B, the rear side of the main body 11 (vest) is configured with nine airbags 12 corresponding to the left, middle and right parts of upper back, the left, middle and right parts of middle back, and the left, middle and right parts of lower back, respectively, and at least a part of the nine airbags 12 have different sizes. For example, a part of the airbags 12 at the left, middle and right parts of upper back substantially have the same size, but the airbags 12 at the left, middle and right parts of upper back substantially have the same size are different from (smaller than) the airbags 12 at the left, middle and right parts of middle back, and the left, middle and right parts of lower back. In different embodiments, all of the airbags 12 at the left, middle and right parts of upper back substantially have the same size. In addition, the airbags 12 at the left, middle and right parts of middle back are smaller than the airbags 12 at the left, middle and right parts of lower back. To be noted, the sizes of the plurality of airbags 12 at the rear side can be varied and are not limited to the above example.

In different embodiments, the number of the airbags 12 can be less than or greater than 15, and the sizes thereof can be different. That is, the airbags 12 with different sizes can be arranged at different positions of the main body 12 based on the user's requirement. For example, if the front side of the main body 11 is configured with 5 airbags, these airbags can be arranged at the positions of the vest (main body 11) corresponding to the left chest, right chest, abdomen, left shoulder, and right shoulder. In this disclosure, the number, sizes and positions of the airbags 12 as well as the shape of the main body 11 are not limited. In practice, the user can arrange the airbags 12 in different sizes at proper positions based on the personal demand and the shape of the main body 11, thereby providing the required somatosensory experience.

To be noted, in the embodiment as showing in FIGS. 3A and 3B, the number of the inflating modules 13 is equal to the number of the airbags 12, wherein one inflating module 13 corresponds to one airbag 12. In different embodiments, one inflating module 13 can correspond to two or more airbags 12, and this disclosure is not limited thereto.

Figure 4A:
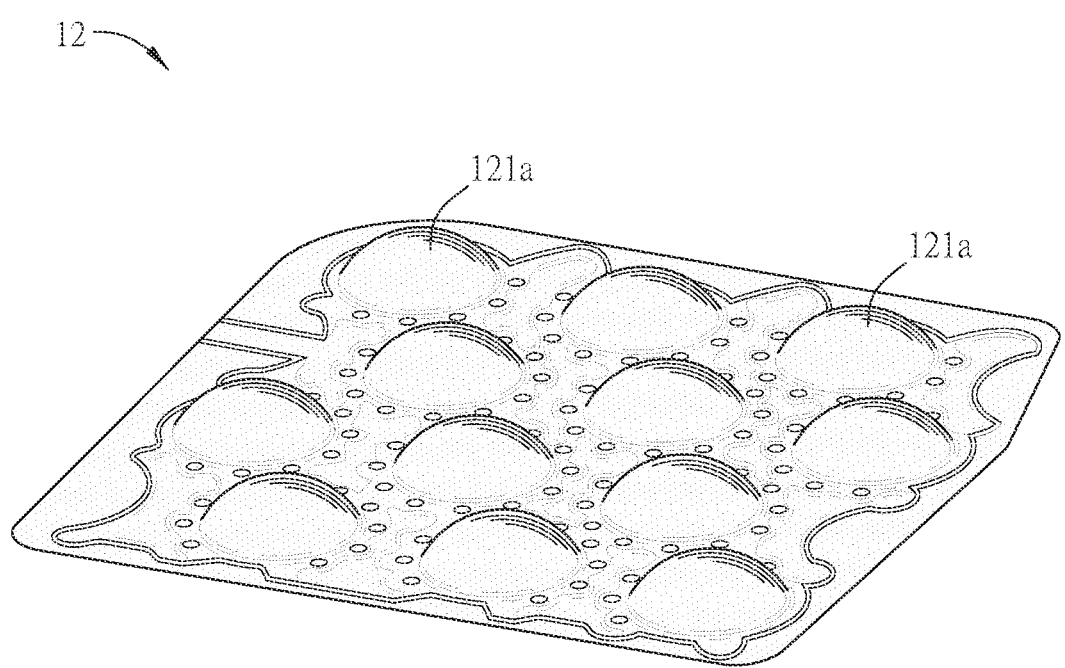
FIGS. 4A to 4C are schematic diagrams showing different types of airbags (inflated statuses).
Figure 4B:
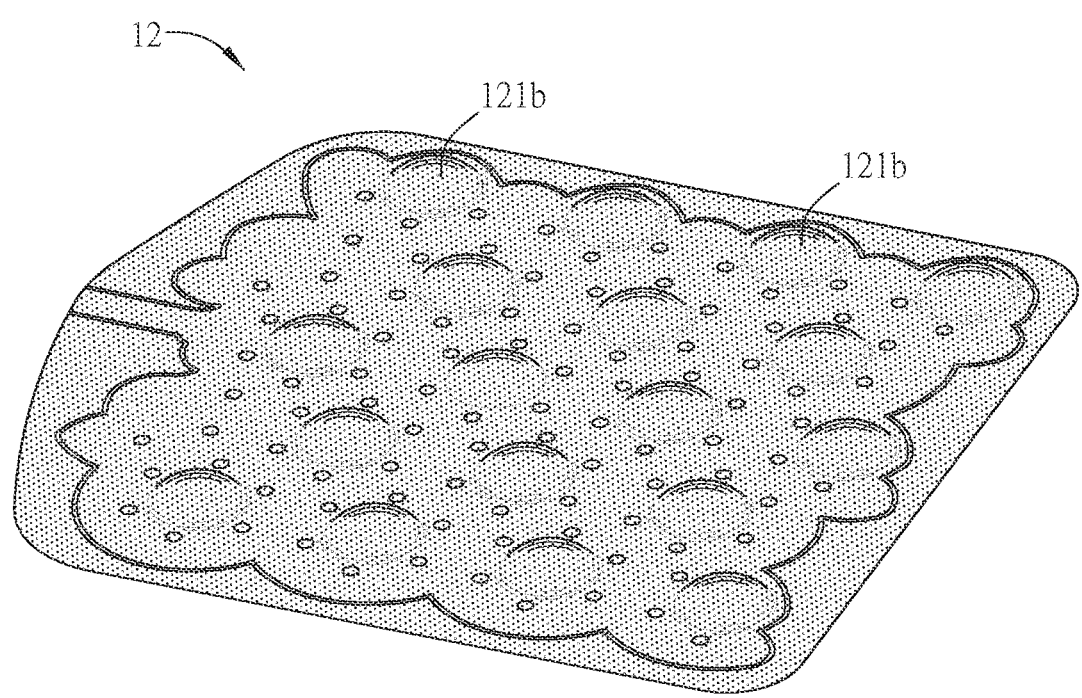
Figure 4C:
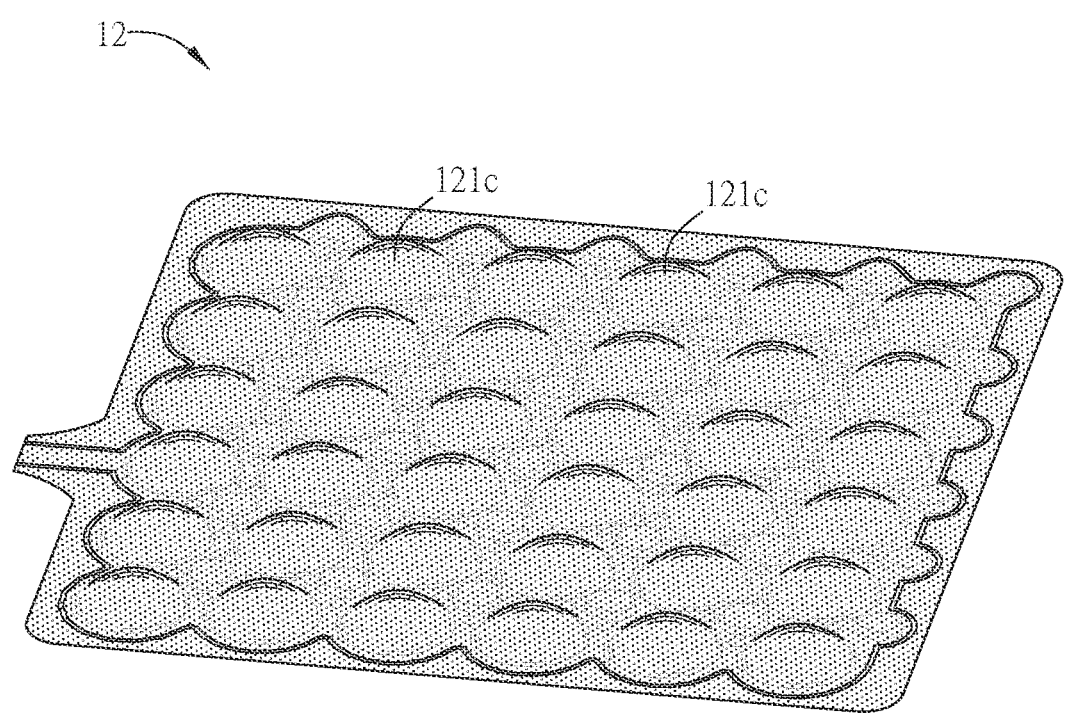

FIGS. 4A to 4C are schematic diagrams showing different types of airbags (inflated statuses). Herein, FIGS. 4A to 4C show three different types of airbags 12. Specifically, the size of the air cells 121a of FIG. 4A is larger than the size of the air cells 121b of FIG. 4B and the size of the air cells 121c of FIG. 4C, and the arrangement density of the air cells 121c of FIG. 4C is greater than the arrangement density of the air cells 121a of FIG. 4A and the arrangement density of the air cells 121b of FIG. 4B.

Referring to FIGS. 1 and 2, the control module 14 is detachably disposed on the main body 11 and is electrically connected to the inflating modules 13. The control module 14 includes a control circuit, which can control the inflating modules 13 to inflate the airbags 12 according to a control signal CS, so that the airbags 12 can swell to provide a pushing force. In this embodiment, the airbag 12 comprises a plurality of air cells 121. When the inflating modules inflate the corresponding airbags 12, the air cells 121 of each airbag 12 can be swelled and expand, so that the user wearing the modular pneumatic somatosensory device 1 can experience the feelings of vibration and being held and squeezed. To be noted, in addition to the application of motion sensing games, the modular pneumatic somatosensory device 1 of this embodiment can also be applied to other applications. For example, the baby children, who cannot be properly protected by car seat belts, can wear the modular pneumatic somatosensory device 1, and the inflating modules 13 can inflate the airbags 12 (e.g. the airbags 12 positioned at the chest, abdomen and back). When the car is subjected to an impact, the expanded air cells 121 can provide impact buffering, reduce the impact force on children in the collision accident, and thus improve the safety of children in the car.

Different inflating modules 13 can provide the same or different airflow flux (liters/min), and the control module 14 can output corresponding electrical signals according to the control signal CS to control the inflating time or voltage of the inflating modules 13 to inflate the corresponding airbags 12. In this case, the control signal CS can control one inflating module 13 to inflate one airbag 12, or control multiple inflating modules 13 to inflate multiple airbags 12 at the same time, and this disclosure is not limited thereto.

As shown in FIG. 1, in order to achieve signal transmission, the control module 14 further comprises a communication unit 141, which is configured to receive the control signal CS, and the virtual reality (VR) device 2 (or the augmented reality (AR) device) also comprises another communication unit 21 corresponding to the communication unit 141. Through the communication units 141 and 21, the control signal CS can be transmitted from the VR device 2 to the control module 14, so that the control module 14 can control the inflating module 13 to inflate the corresponding airbag 12 according to the control signal CS. The modular pneumatic somatosensory device 1 of this embodiment can be applied to the motion sensing games, for example, applied within the VR device 2. In different embodiments, the modular pneumatic somatosensory device 1 can also be applied to an AR device. In addition, the control signal CS transmitted from the VR device 2 of this embodiment is a wireless transmitted signal, such as the signals transmitted by Wi-Fi, Bluetooth, mobile network (e.g. 3G, 4G or 5G), or the like. In different embodiments, the control signal CS can also be a wired transmitted signal, and the VR device 2 is connected to the control module 14 by a physical connection line. To be noted, how the VR 2 generates the control signal CS is not the technical feature of this disclosure, and will not be described in detail here.

In addition, the power module 15 can be detachably disposed on the main body 11, and is electrically connected to the control module 14 and the inflating modules 13. The power module 15 can comprise a lithium battery for providing the electric power to the control module 14 and the inflating modules 13, and a switch 16 is configured between the power module 15 and the control module 14. As shown in FIG. 3A, the power module 15 of this embodiment is, for example, disposed at a position on the main body 11 corresponding to the shoulder.

The above-mentioned airbags 12, inflating modules 13, control module 14 and power module 15 can be detachably disposed on/in the main body 11 by hook and loop fasteners (AKA Velcro fasteners) and/or buckle fasteners (including the buckle part and fasten part), or any of other suitable fastening components, so that the user can assemble, disassemble, repair or replace parts by himself/herself.

In summary, in the modular pneumatic somatosensory device of this disclosure, the airbags are detachably disposed at different positions of the main body, and at least a part of the airbags have different sizes. The inflating modules are detachably disposed on the main body, and each of the inflating modules is correspondingly connected with at least one of the airbags. The control module is detachably disposed on the main body and electrically connected with the inflating modules. The control module controls the inflating modules to inflate the corresponding airbags according to a control signal. Accordingly, the modular pneumatic somatosensory device of this disclosure has the following advantages of: 1. adapting the modular design instead of the integral design, so that the user can assemble, disassemble, repair or replace parts by himself/herself; 2. in the application of, for example, motion sensing games, the airbags of different sizes can be optionally installed corresponding to different parts of the user's body based on the somatosensory operation requirements so as to feedback the real-time somatosensory of different body parts, so that the user can experience the feelings of vibration and being held and squeezed at different body parts, thereby achieving a high operation flexibility and freedom; and 3. for children who are not suitable for using car seat belts, the modular pneumatic somatosensory device can reduce the impact force of collision accidents and reduce the probability and severity of injuries.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A modular pneumatic somatosensory device, comprising:
   a main body;
   a plurality of airbags detachably disposed at different positions of the main body, wherein at least a part of the airbags have different sizes, each of the airbags has a connecting tube, the connecting tubes of the airbags with different sizes have different colors;
   a plurality of inflating modules detachably disposed on the main body, wherein each of the inflating modules has a connecting tube, the connecting tubes of the inflating modules have different colors, each of the inflating modules comprises an inflator pump; and
   a control module detachably disposed on the main body and electrically connected with the inflating modules, wherein the control module controls the inflating modules to inflate the corresponding airbags according to a control signal,
   wherein the connecting tubes of the inflating modules and the connecting tubes of the corresponding airbags have identical colors;
   wherein the number of the inflating modules is equal to the number of the airbags, each of the inflating modules is correspondingly connected with one of the airbags, a region projected on the main body by each of the inflating modules overlaps with a region where the correspondingly connected airbag is projected on the main body, an area projected on the main body by each of the inflating modules is smaller than an area projected on the main body by the correspondingly connected airbag.

2. The modular pneumatic somatosensory device of claim 1, wherein the airbags, the inflating modules and the control module are detachably disposed on the main body by hook and loop fasteners and/or buckle fasteners.

3. The modular pneumatic somatosensory device of claim 1, wherein the airbags having different sizes are disposed at different positions of the main body based on a requirement of a user.

4. The modular pneumatic somatosensory device of claim 1, wherein each of the airbags comprises a plurality of air cells, and the inflating module inflates the corresponding airbag so as to inflate the air cells of the airbag.

5. The modular pneumatic somatosensory device of claim 1, wherein the control signal is a wireless transmitted signal.

6. The modular pneumatic somatosensory device of claim 1, wherein the control signal is a wire transmitted signal.

7. The modular pneumatic somatosensory device of claim 1, wherein the control module comprises a communication unit, and the communication receives the control signal.

8. The modular pneumatic somatosensory device of claim 7, wherein the control signal is received from a VR device or an AR device.

9. The modular pneumatic somatosensory device of claim 8, wherein the VR device or the AR device comprises a communication unit corresponding to the communication unit of the control device.

10. The modular pneumatic somatosensory device of claim 1, further comprising: a power module detachably disposed on/in the main body, wherein the power module is electrically connected to the control module and the inflating modules.

* * * * *